United States Patent [19]

Volk et al.

[11] 4,151,140

[45] Apr. 24, 1979

[54] PROCESS FOR HYDROLYZING WATER-SOLUBLE CARBOXAMIDE POLYMERS

[75] Inventors: Henry Volk, Bay City; Jack C. Lamphere, Midland, both of Mich.

[73] Assignee: The Dow Chemical Company, Midland, Mich.

[21] Appl. No.: 847,878

[22] Filed: Nov. 2, 1977

[51] Int. Cl.$^2$ .............................................. C08L 33/24
[52] U.S. Cl. ...................... 260/29.6 H; 260/29.6 WQ; 260/29.6 HN
[58] Field of Search ................. 260/29.6 H, 29.6 WQ, 260/29.6 HN

[56] References Cited

U.S. PATENT DOCUMENTS

| | | | |
|---|---|---|---|
| 2,820,777 | 1/1958 | Suen et al. | 260/29.6 H |
| 3,022,279 | 2/1962 | Proffitt | 260/29.6 H |
| 3,284,393 | 11/1966 | Vanderhoff et al. | 260/29.6 HN |
| 3,624,019 | 11/1971 | Anderson et al. | 260/29.6 HN |
| 3,734,873 | 5/1973 | Anderson et al. | 260/29.6 HN |
| 3,915,920 | 10/1975 | Slovinsky et al. | 260/29.6 WQ |

FOREIGN PATENT DOCUMENTS 2535350  2/1976  Fed. Rep. of Germany ..... 260/29.6 H

*Primary Examiner*—M. J. Welsh

[57] ABSTRACT

A stable, water-in-oil emulsion of a partially hydrolyzed carboxamide polymer is prepared by contacting a water-in-oil emulsion of an inherently water-dispersible polymer containing carboxamide groups, e.g., polyacrylamide, with a water-in-oil emulsion of a hydrolyzing agent such as sodium hydroxide. By emulsifying the hydrolyzing agent prior to hydrolysis, the hydrolysis reaction can be carried out over a wider range of reaction conditions such as temperature and the like without destroying the water-in-oil emulsion of the polymer.

5 Claims, No Drawings

PROCESS FOR HYDROLYZING WATER-SOLUBLE CARBOXAMIDE POLYMERS

BACKGROUND OF THE INVENTION

The present invention relates to methods for hydrolyzing water-soluble polymers that normally hydrolyze when contacted with base.

The use of partially hydrolyzed polyacrylamides and other carboxamide polymers (often called anionic polyacrylamides) in such applications as enhanced recovery of petroleum, flocculation of finely divided solids from aqueous suspension and the like is well known. In such applications it is often desirable to convert from about 1 to about 65 mole percent of the carboxamide groups of the polymer to carboxy groups.

For the production of high molecular weight, partially hydrolyzed polyacrylamides and other carboxamide polymers, it has been suggested that the carboxamide polymer in aqueous solution be hydrolyzed to the desired extent by contacting the aqueous solution with alkali such as sodium hydroxide. However, the preparation of a homogeneous hydrolyzed carboxamide product by such method is difficult because of the high viscosities of aqueous solutions of such polymers. Such high viscosities hinder and often prevent uniform mixing of the alkali with the aqueous solution of the polymer. Thus in such a method of operation, it is generally found that some of the polymer is hydrolyzed to a greater extent than desired while other portions of the polymer undergo little or no hydrolysis.

In order to overcome such problems of non-uniform hydrolysis, partially hydrolyzed carboxamide polymers have been prepared by polymerizing the carboxamide monomer in an aqueous medium containing sodium hydroxide or sodium carbonate (see U.S. Pat. No. 2,820,777 and 3,022,279). While these methods do improve the uniformity of hydrolysis, the presence of the sodium hydroxide or the sodium carbonate may interfere to some extent with the polymerization thereby hindering if not preventing the formation of the very high molecular weight polymers that are desired.

Other attempts to overcome the problems of non-uniform hydrolysis have involved the formation of an emulsion of the aqueous solution of the polymer in oil (so-called water-in-oil emulsions) and reacting that emulsion with aqueous solutions of base such as sodium hydroxide. See German Patent Application No. 2,535,350. Unfortunately this procedure does not totally overcome the problems of non-uniform hydrolysis over wide ranges of reaction conditions that are often desirable to employ in the hydrolysis of carboxamide polymers. In particular it is generally necessary to carry out the process using rather dilute (e.g., less 35 weight percent) aqueous solutions of the polymer in order to avoid significant destabilization of the water-in-oil emulsion.

In view of the aforementioned deficiencies of the prior art methods, it would be highly desirable to provide an improved method for hydrolyzing carboxamide polymers under conditions of rapid hydrolysis whereby the resulting polymer product exhibits the desired stability, uniform degree of hydrolysis and high molecular weight.

SUMMARY OF THE INVENTION

The present invention is such an improved method which comprises contacting a water-in-oil emulsion of an inherently water-dispersible carboxamide polymer having a plurality of carboxamide groups with a hydrolyzing amount of a water-in-oil emulsion of a hydrolyzing agent whereby the desired portion of carboxamide groups of the polymer are hydrolyzed to carboxy groups.

For the purposes of this invention a carboxamide polymer is a polymer of one or more ethylenically unsaturated monomers wherein at least about 50 mole percent of its mers are substituted with carboxamide groups. The term "inherently water dispersible" means that the polymer will disperse in water to form an aqueous solution or colloidal emulsion or dispersion of the polymer without the aid of an external surfactant. An emulsion as employed herein is a dispersion of colloidal size liquid particles in a liquid continuous phase. In a water-in-oil emulsion, the oil phase is the continuous phase and the water phase, e.g., an aqueous solution of the carboxamide polymer or the hydrolyzing agent, forms the disperse phase.

Surprisingly, the water-in-oil emulsion of the partially hydrolyzed carboxamide polymer prepared in the practice of this invention exhibit excellent stability, a very uniform degree of hydrolysis and a low viscosity at relatively high concentration of the partially hydrolyzed polymer in the emulsion.

In addition to being useful polymer components in water flooding procedures used in enhanced oil recovery, the water-in-oil emulsions of the present invention are also useful as flocculants for industrial and municipal wastes and other aqueous suspensions and as additives in the manufacture of paper.

DETAILED DESCRIPTION OF ILLUSTRATIVE EMBODIMENTS

Advantageously, the water-in-oil emulsions of the carboxamide polymers are suitably any in which the disperse phase is the aqueous phase containing the carboxamide polymer and the continuous phase is a water-immiscible, inert liquid medium. While the ratio of the water phase to the oil phase is suitably any ratio that permits the formation of a stable water-in-oil emulsion, it is generally desirable to minimize the proportion of oil phase and thereby maximize the concentration of the carboxamide polymer in the emulsion. For similar reasons, it is desirable that the concentration of the carboxamide polymer in the disperse phase be as concentrated as possible i.e., at least 35 weight percent of polymer based on the weight of the aqueous phase. However, the concentration of the polymer in the aqueous phase is less than that which appreciably destabilizes the water-in-oil emulsion. Preferably, based on the total volume of the water-in-oil emulsion, the disperse phase constitutes from about 20 to about 80, more preferably from about 50 to about 78, most preferably from 60 to 75, volume percent and the continuous oil phase constitutes from about 80 to about 20, more preferably from about 50 to about 22, most preferably from 40 to 25, volume percent. Preferably the concentrated aqueous phase containing the carboxamide polymer contains from about 35 to about 65, more preferably from about 40 to about 60, most preferably from about 40 to about 50 weight percent of the polymer.

The carboxamide polymer is suitably any polymer of ethylenically unsaturated monomer or monomers wherein at least about 50 mole percent of the polymerized monomer units (so-called mers) have pendant carboxamide groups. Preferably from about 50 to about 90 mole percent and most preferably from about 85 to about 100 mole percent of the mers have pendant carboxamide groups. The carboxamide polymer is further characterized as being at least inherently water dispersible and preferably water soluble and insoluble in the water-immiscible, inert liquid of the continuous oil phase. Most preferably such polymers are generally linear in structure. For the purposes of this invention, the carboxamide group is represented by the formula:

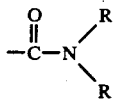

wherein each R is individually hydrogen; alkyl; aminoalkyl, particularly dialkylaminomethyl; hydroxyalkyl; or —R'—N(R")$_3$X$\ominus$ wherein R' is alkylene, preferably methylene; each R" is individually hydrogen, alkyl or hydroxyalkyl; and X$\ominus$ is a neutralizing anion such as chloride, bromide, methylsulfate anion, hydroxide and the like. In preferred carboxamide polymers, R is hydrogen or alkyl, most preferably hydrogen.

Preferred carboxamide polymers are the polymers of acrylamide and methacrylamide, with the homopolymers of acrylamide and copolymers thereof containing at least 85 mole percent of acrylamide being especially preferred.

In addition to the aforementioned carboxamide monomers, the carboxamide copolymers may contain up to about 50 mole percent of one or more other comonomers copolymerizable with the carboxamide monomer(s). Examples of such other comonomers include vinyl esters of saturated carboxylic acids such as vinyl acetate and vinyl propionate, ethylenically unsaturated carboxylic acids and anhydrides such as acrylic acid, methacrylic acid and maleic anhydride, ethylenically unsaturated sulfonic acids such as vinylbenzyl sulfonic acid and similar water soluble monomers. In addition to the aforementioned water soluble comonomers, the carboxamide polymer may contain up to about 15 mole percent of copolymerizable water-insoluble monomers such as monovinylidene aromatics, e.g., styrene; vinyl halides, e.g., vinyl chloride and vinylidene chloride; and the like. While the carboxamide polymer may contain minor amounts of unsaturated esters such as the alkyl acrylates and methacrylates, it should be understood that such esters will be hydrolyzed under the conditions of the method of this invention.

The molecular weight of the carboxamide polymer is not particularly critical and may vary over a wide range from about 10,000 to over 25,000,000. Preferred carboxamide polymers have weight average molecular weights in excess of 500,000, most preferably in excess of 1,000,000.

The water-immiscible (oil) phase of the emulsion generally comprises at least one inert hydrophobic liquid. Usually such liquid is an organic liquid such as a liquid hydrocarbon or substituted hydrocarbon liquid. A preferred group of organic liquids are the liquid hydrocarbons having from 4 to 15 carbons including aromatic and aliphatic hydrocarbons and mixtures thereof, e.g., benzene, xylene, toluene, mineral oils, liquid paraffins, such as kerosene, naphtha and the like.

The water-in-oil emulsions of the carboxamide polymer are suitably prepared by any one of several known techniques, e.g., those described in U.S. Pat. Nos. 3,284,393; 3,624,019; and 3,734,873. The water-in-oil emulsion is preferably prepared by the polymerization method described in U.S. Pat. No. 3,284,393 which is hereby incorporated by reference. In that method an aqueous solution of the monomer is dispersed in an inert hydrophobic liquid organic dispersing medium containing a sufficient amount of a hydrolysis stable water-in-oil emulsifying agent and the resulting emulsion is then heated under free radical forming conditions to polymerize the monomer in the disperse phase to form the desired water-in-oil emulsion.

Suitable emulsifying agents are those agents which enable the formation of a water-in-oil emulsion and which are not reacted or destroyed during the hydrolysis of the carbamoyl polymer. Generally, the emulsifying agents are nonionic or anionic and permit the inversion of the water-in-oil emulsion to oil-in-water emulsion when sufficient aqueous liquid is added to the water-in-oil emulsion. The hydrophobic-lipophobic balance (HLB) of the emulsifying agent is preferably in the range from about 3 to 12, preferably 4 to 9. Preferably, the emulsifying agent is the amide reaction product of oleic acid with isopropanol amide. Other suitable emulsifying agents include hexadecyl sodium phthalate, cetyl sodium phthalate, octadecyl sodium phthalate, metal soaps and other hydrolysis stable oil-soluble emulsifying agents as described in U.S. Pat. No. 3,284,393. The emulsifying agent is employed in an amount sufficient to provide a water-in-oil emulsion. Generally, such an amount of emulsifying agent is within the range from about 0.1 to about 20, preferably from about 1.5 to about 3, weight percent based on the weight of the aqueous phase.

The hydrolyzing agent employed in the practice of this invention is suitably any agent capable of hydrolyzing the carboxamide polymer under normal hydrolysis conditions, i.e., those which do not otherwise adversely affect the polymer. Preferably the agent is a strong base such as an aqueous solution of an alkali metal hydroxide, e.g., sodium hydroxide, potassium hydroxide and the like, ammonium hydroxide. Aqueous solutions of alkali metal carbonates such as sodium and potassium carbonate are also effective hydrolyzing agents. The concentration of the hydrolyzing agent is not particularly critical so long as the concentration is sufficient to cause hydrolysis and not so high as to cause destabilization of the emulsion. Preferably, the aqueous solution of the agent contains from about 10 to about 60 weight percent, more preferably from about 20 to about 40 weight percent of the agent, with higher concentrations being most preferred in order to minimize the dilution of the emulsion.

A unique and critical feature of the method of this invention is the emulsified form of the aqueous solution of hydrolyzing agent at the time it is brought into contact with the carboxamide polymer. Like the carboxamide polymer, the aqueous agent exists in the form of water-in-oil emulsion. In general, such water-in-oil emulsion is readily formed by dispersing with stirring the aqueous solution of the agent in an oil phase containing a hydrolysis stable water-in-oil emulsifying agent similar to the type used in preparing the water-in-oil emulsion of the carboxamide polymer. It should be understood that the emulsifying agent employed should be hydrolysis stable, i.e., not readily destroyed upon contact with the hydrolyzing agent. Of the several suitable water-in-oil emulsifying agents, the nonionic oil-soluble ones such as described hereinbefore are preferred, particularly when the hydrolyzing agent is an alkali metal hydroxide such as sodium hydroxide. While the ratio of aqueous phase to oil phase in this emulsion is not particularly critical, the aqueous phase advantageously constitutes from about 50 to about 75 volume percent of the total emulsion and the oil phase constitutes from about 50 to about 25 volume percent.

In contacting the carboxamide polymer with the hydrolyzing agent, the emulsion of each are mixed together in any order of addition. As a result of mixing the reactants in emulsified form, the contact of reactants is instantaneous and uniform throughout the reaction mixture. Preferably, the temperature of hydrolysis may vary from 25° to about 100° C., most preferably from about 60° to about 80° C. At the higher temperatures within this range, the hydrolysis reaction is completed within about 0.25 hour. The amount of hydrolyzing agent added to the reaction mixture is generally stoichiometric to the amount of hydrolysis of the carboxamide polymer that is desired. Usually the amount of hydrolyzing agent varies from about 1 to about 65 mole percent of the amount which is stoichiometrically equivalent to the total number of carboxamide groups present in the polymer.

The resulting emulsion obtained after the hydrolysis reaction is a fluid liquid which is easily poured or pumped. The emulsion is readily converted to use by adding it to an aqueous medium such that it inverts to form an aqueous solution of the partially hydrolyzed carboxamide polymer.

The following examples are set forth to further illustrate the invention but should not be construed as limiting its scope. All parts and percentages are by weight unless otherwise indicated.

EXAMPLE 1

A 240-gram portion of an oil phase consisting of 16.8 grams of the isopropanol amide of oleic acid (85 percent active), 13.1 mls of a 1 percent solution of acetic anhydride in Isopar M (a mixture of isoparaffinic hydrocarbons having a flash point of 170° F.) and a remaining amount of Isopar M is mixed with a 560-gram portion of an aqueous phase consisting of 168 grams of acrylamide, 3.36 mls of 10 percent aqueous pentasodium salt of diethylene triamine pentaacetic acid and a remaining amount of water are blended together in a Waring Blendor operating at a rate sufficient to produce a water-in-oil emulsion in which the dispersed droplets have an average diameter less than 10 micrometers. The resulting water-in-oil emulsion is placed in a 1-liter glass resin kettle equipped with a stirrer, nitrogen sparger, thermometer, water bath and gas exit. The kettle containing the water-in-oil emulsion is sparged for about one hour with nitrogen to remove any oxygen in the system. The water-in-oil emulsion is then subjected to polymerization conditions as described in U.S. Pat. No. 3,284,393 thereby forming a water-in-oil emulsion of the polymer.

A water-in-oil emulsion of sodium hydroxide is prepared by blending 23.7 grams of sodium hydroxide, 35.6 grams of water, 1.8 grams of isopropanol amide of oleic acid (85 percent active) in 23.6 grams of Isopar M in a Waring Blendor operating at a rate sufficient to produce a water-in-oil emulsion in which the dispersed droplets have an average diameter less than 10 micrometers. The emulsified sodium hydroxide is added from a dropping funnel to the water-in-oil emulsion of the polymer over a 10-minute period. The reaction mixture is heated to 65° C. at which the pressure of the reaction vessel was reduced to 200 mm Hg. Heating of the reaction mixture is continued for three hours at 62°-68° C. during which time 247 grams of distillate are removed. The recovered distillate contains 224 grams of water, 23 grams of Isopar M and dissolved ammonia which is a by-product of the hydrolysis reaction. The reacted polymer is recovered and analyzed for pH, viscosity, percent hydrolysis, and percent solids. The pH of the water-in-oil emulsion of polymer at a 0.5 percent solution based on polymer solids is 7.8. The Ostwald Viscosity of the polymer in an aqueous solution containing 0.3 percent of the polymer and 4 percent of sodium chloride and having a pH of 7 and a temperature of 25° C. is 19.8 centipoises. The water-in-oil emulsion of polymer contains 35.4 percent polymer solids, and the polymer has a mole percent hydrolysis of 17.4.

EXAMPLE 2

Another run is carried out generally according to the procedure of Example 1 except that the concentration of acrylamide in the aqueous phase is increased from 30 percent to 40 percent. The resultant product is recovered and tested for percent hydrolysis, viscosity, percent polymers and stability. The results of these tests are recorded in Table I.

For purposes of comparison, polyacrylamide water-in-oil emulsion of this example are contacted with dry NaOH and a 40 percent aqueous solution of NaOH under hydrolysis conditions that are otherwise similar to those used in this example and in Example 1. The resulting hydrolyzed products are similarly tested and the results are recorded in Table I.

TABLE I

| Sample No. | Hydrolysis Agent | % Hydrolysis | Viscosity (1) cps | % Solids | Stability (2) % Waste |
|---|---|---|---|---|---|
| 1 | Emulsified NaOH | 20.6 | 16.6 | 35.2 | 0.6 |
| $C_1$* | Aqueous NaOH | 17.8 | 16.0 | 33.4 | 12.3 |
| $C_2$* | Dry NaOH | 18.8 | 17.4 | 36.2 | 11.8 |

*Not an example of the invention
(1) Ostwald Viscosity in centipoises determined under the conditions described in Example 1
(2) % Waste is determined by passing the hydrolyzed product through a 100 mesh nylon screen and dividing weight of product retained on screen by total weight of initial product.

As evidenced by the data of the foregoing table, the product hydrolyzed by the method of this invention exhibits significantly lower filtered waste (and therefore better stability) than products hydrolyzed by an aqueous NaOH or dry NaOH. Similar improvements are obtained in the hydrolysis of other water-in-oil emulsions of polyacrylamide wherein the polyacrylamide constitutes from about 40 to about 50 percent of the aqueous phase.

What is claimed is:

1. In a method for hydrolyzing an inherently water-dispersible carboxamide polymer having a plurality of carboxamide groups dispersed in the aqueous phase of a water-in-oil emulsion wherein the emulsion is contacted with a hydrolyzing agent, said carboxamide polymer being a polymer containing at least 50 mole percent of polymers having substituent carboxamide groups represented by the formula:

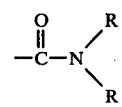

wherein each R is individually hydrogen, alkyl, aminoalkyl, hydroxyalkyl or —R'—N+(R")$_3$X$\ominus$ wherein R' is alkylene, each R" is individually alkyl or hydroxyalkyl and X$\ominus$ is a neutralizing anion, the improvement which comprises contacting the water-in-oil emulsion of the polymer with a water-in-oil emulsion of the hydrolyzing agent whereby the desired portion of carboxamide groups are hydrolyzed to carboxy groups without significantly destabilizing the water-in-oil emulsion of the polymer.

2. The improvement of claim 1 wherein the aqueous phase of the water-in-oil emulsion of the carboxamide polymer contains from about 40 to about 60 weight percent of the polymer.

3. The improvement of claim 2 wherein the hydrolyzing agent is an alkali metal hydroxide or an alkali metal carbonate.

4. The improvement of claim 3 wherein the carboxamide polymer is an acrylamide polymer containing at least 85 mole percent of acrylamide, the volume ratio of the aqueous phase to oil phase in the water-in-oil emulsion of the polymer is from about 80:20 to about 20:80, the aqueous phase of the polymer emulsion contains from about 40 to about 50 weight percent of the polymer and the water-in-oil emulsion of hydrolyzing agent contains from about 20 to about 40 weight percent of sodium hydroxide.

5. The improvement of claim 4 wherein the volume ratio of the aqueous phase to oil phase of the water-in-oil emulsion of the polymer is from about 60:40 to about 75:25, the volume ratio of aqueous phase to oil phase of the water-in-oil emulsion of sodium hydroxide is from about 50:50 to about 75:25 and the amount of sodium hydroxide is in the range from about 1 to 65 mole percent of the amount which is stoichiometrically equivalent to the total number of carboxamide groups in the polymer.

* * * * *

UNITED STATES PATENT AND TRADEMARK OFFICE
CERTIFICATE OF CORRECTION

PATENT NO. : 4,151,140
DATED : April 24, 1979
INVENTOR(S) : Henry Volk; Jack C. Lamphere It is certified that error appears in the above–identified patent and that said Letters Patent are hereby corrected as shown below:

Column 4, line 18, insert --about-- before "12".

Column 4, line 20, delete "amide" and insert --amine--.

Column 6, line 61, delete "polymers" and insert --mers--.

Signed and Sealed this

Second Day of October 1979

[SEAL]

Attest:

RUTH C. MASON
Attesting Officer

LUTRELLE F. PARKER
Acting Commissioner of Patents and Trademarks